(12) United States Patent
Kalina

(10) Patent No.: US 8,534,070 B2
(45) Date of Patent: Sep. 17, 2013

(54) POWER SYSTEMS DESIGNED FOR THE UTILIZATION OF HEAT GENERATED BY SOLAR-THERMAL COLLECTORS AND METHODS FOR MAKING AND USING SAME

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 865 days.

(21) Appl. No.: 12/698,231

(22) Filed: Feb. 2, 2010

(65) Prior Publication Data
US 2011/0185727 A1 Aug. 4, 2011

(51) Int. Cl.
*B60K 16/00* (2006.01)
*F01K 25/06* (2006.01)

(52) U.S. Cl.
USPC ............... 60/641.8; 60/649; 60/651; 60/671; 60/673

(58) Field of Classification Search
USPC ............... 60/641.8, 649, 651, 653, 671, 673, 60/676
See application file for complete search history.

(56) References Cited

U.S. PATENT DOCUMENTS

| | | | |
|---|---|---|---|
| 6,065,280 A * | 5/2000 | Ranasinghe et al. ............ | 60/774 |
| 6,216,436 B1 * | 4/2001 | Ranasinghe et al. ............ | 60/781 |
| 6,910,334 B2 * | 6/2005 | Kalina ............................. | 60/651 |
| 7,841,179 B2 * | 11/2010 | Kalina ............................. | 60/649 |
| 2010/0205962 A1 * | 8/2010 | Kalina ............................. | 60/641.8 |

* cited by examiner

*Primary Examiner* — Hoang Nguyen
(74) *Attorney, Agent, or Firm* — Robert W Strozier

(57) ABSTRACT

Embodiments of the present invention disclose systems and methods for the efficient conversion of solar energy into a useable form of energy using a solar collector subsystem and a heat conversion subsystem. The systems and methods transfer solar energy directly to an intermediate solution and a working solution and indirectly to and between a basic rich solution, a condensing solution, a lean solution and a rich vapor solution. The systems and methods also include condensing the basic rich solution using an external coolant. The systems and methods support a closed thermodynamic cycle.

17 Claims, 6 Drawing Sheets

CS-34s

POWER SYSTEMS DESIGNED FOR THE UTILIZATION OF HEAT GENERATED BY SOLAR-THERMAL COLLECTORS AND METHODS FOR MAKING AND USING SAME

BACKGROUND OF THE INVENTION

1. Field of the Invention

Embodiments of the present invention relates to power systems designed for the utilization of heat generated by solar-thermal collectors and methods for making and using same.

Embodiments of the present invention relates to power systems designed for the utilization of heat generated by solar-thermal collectors and methods for making and using same, where the system includes a plurality of solar-thermal collectors that can either heat directly a multi-component fluid or indirectly through a heat transfer fluid.

2. Description of the Related Art

In a solar-thermal system, solar energy is collected by mirrors and concentrated onto a heat receiver, also called a heat absorber. Here the solar energy is converted into heat, which is thereafter sent to the power system and utilized to generate power.

Heat generated in the absorber can be transferred to an intermediate heat transfer fluid, (HTF), which then transfer its heat to a working fluid of the power cycle of a power system. Alternately, heat in the absorber can be transferred directly to the working fluid of the power cycle of a power system.

Theoretically, the higher the mean temperature generated by solar-thermal collectors in the absorber, the higher the efficiency of the power system utilizing that heat. However, at the same time, the higher the mean temperature of the absorber, the higher the radiated thermal losses from the absorber into the ambient, and thus the lower the efficiency of the solar collectors.

Thus, there is a need in the art for solar-thermal power systems, which can achieve higher mean thermal temperatures in the solar absorber of solar-thermal collectors, while lowering thermal losses to ambient, where the systems can use directly solar heating or can use a heat transfer fluid directly from the solar collectors or from a thermal storage system.

SUMMARY OF THE INVENTION

Embodiments of the present invention provide a system for converted solar energy into mechanical energy, electrical energy or another useable form of energy. The system includes a solar collector subsystem and a heat conversion subsystem. The solar collector subsystem comprises a single solar collector unit, a plurality of series arranged collector units or a solar collector unit and a thermal storage tank unit. The solar collector subsystem can use a heat transfer fluid to heat a working fluid of the heat conversion subsystem or can directly heat the working fluid of the heat conversion subsystem. The solar collector subsystem is adapted to indirectly or directly and separately heat an intermediate solution stream or a working solution stream comprising the intermediate stream and a vaporized basic solution stream. The heat conversion subsystem utilizes a multi-component fluid from which all streams in the heat conversion subsystem are derived including the working solution and the intermediate solution, where the streams differ in a ratio of the components of the multi-component fluid. The solar collector subsystem fully vaporizes and superheats the intermediate solution stream, which is then combined with a fully vaporized basic rich solution stream to form the working solution stream. The solar collector subsystem then superheats the working fluid stream. The fully vaporized and superheated working solution stream is then sent in to a turbine unit of the heat conversion subsystem, where a portion of heat from the fully vaporized and superheated working solution stream is converted into a useable form of energy.

Embodiments of this invention provide a method includes vaporizing and superheating an intermediate solution stream directly or indirectly using heat from a solar collector subsystem. The method also includes combining the vaporized and superheated intermediate solution stream with a vaporized basic rich solution substream to form a vaporized working solution stream, where the vaporized basic rich solution stream is vaporized in three heat exchanges processes by heat remaining in a spent working solution stream or streams derived therefrom. Again all heat used in the method is ultimately derived from the solar collector subsystem. The method also includes superheating the working fluid stream directly or indirectly using heat from the solar collector subsystem. The method also includes converting a portion of heat in the fully vaporized and superheated working fluid stream to a useable form of energy in a turbine. The method also includes forming a condensing solution stream, a basic rich solution stream, a lean solution stream and a vapor rich solution stream from the spent working solution stream. The method also includes separating a partially condensed solution stream into the lean solution stream and the vapor rich solution stream. The method also includes dividing the lean solution stream into three substreams. The method also includes mixing one of the lean solution substreams with the vapor rich solution stream to form the basic rich solution stream. The method also includes mixing a second lean solution substream with the spent working solution stream to form the condensing solution stream. The method also includes mixing the third lean solution substream with a heated basic rich solution substream to form the working solution stream. The method also includes fully condensing the basic rich solution stream with an external coolant stream.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
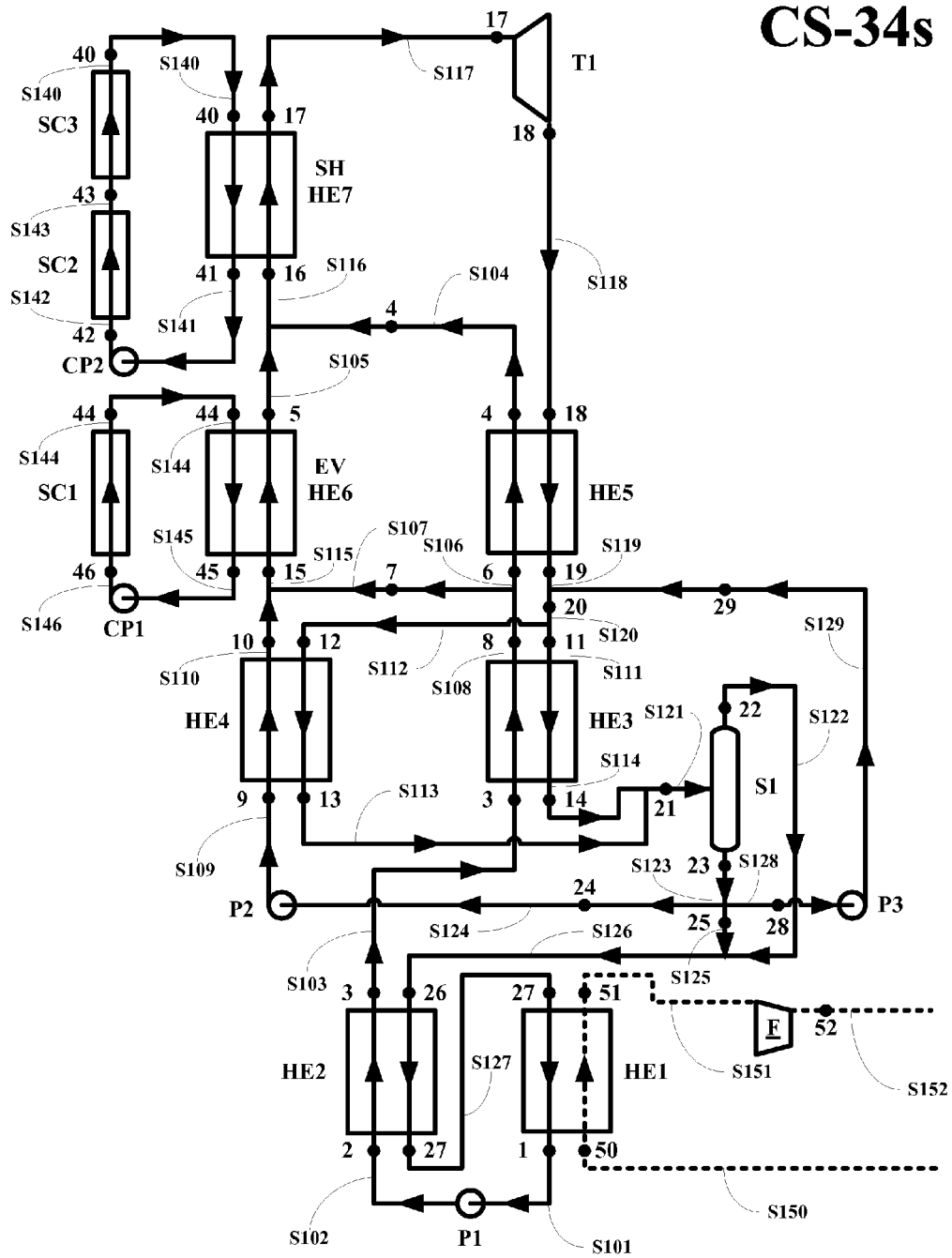
FIG. 1A depicts an embodiment of a system of this invention CS-34s, where a heat transfer fluid is heated by the solar collector subsystem including a plurality of solar collectors and then used to heat a working fluid of a heat conversion subsystem.
Figure 1B:
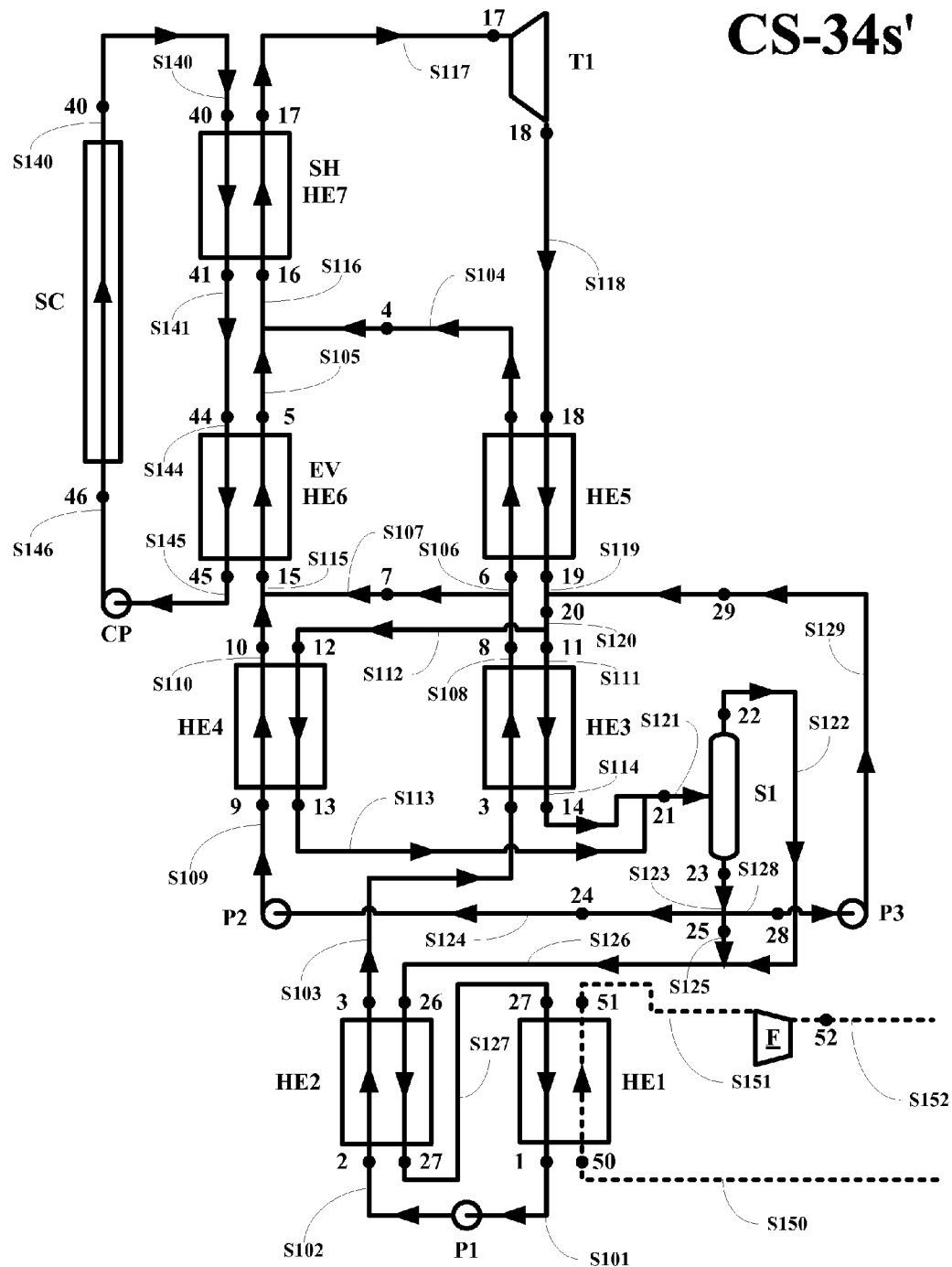
FIG. 1B depicts another embodiment of a system of this invention CS-34s', where a heat transfer fluid is heated by the solar collector subsystem including a single solar collector and then used to heat a working fluid of a heat conversion subsystem.
Figure 1C:
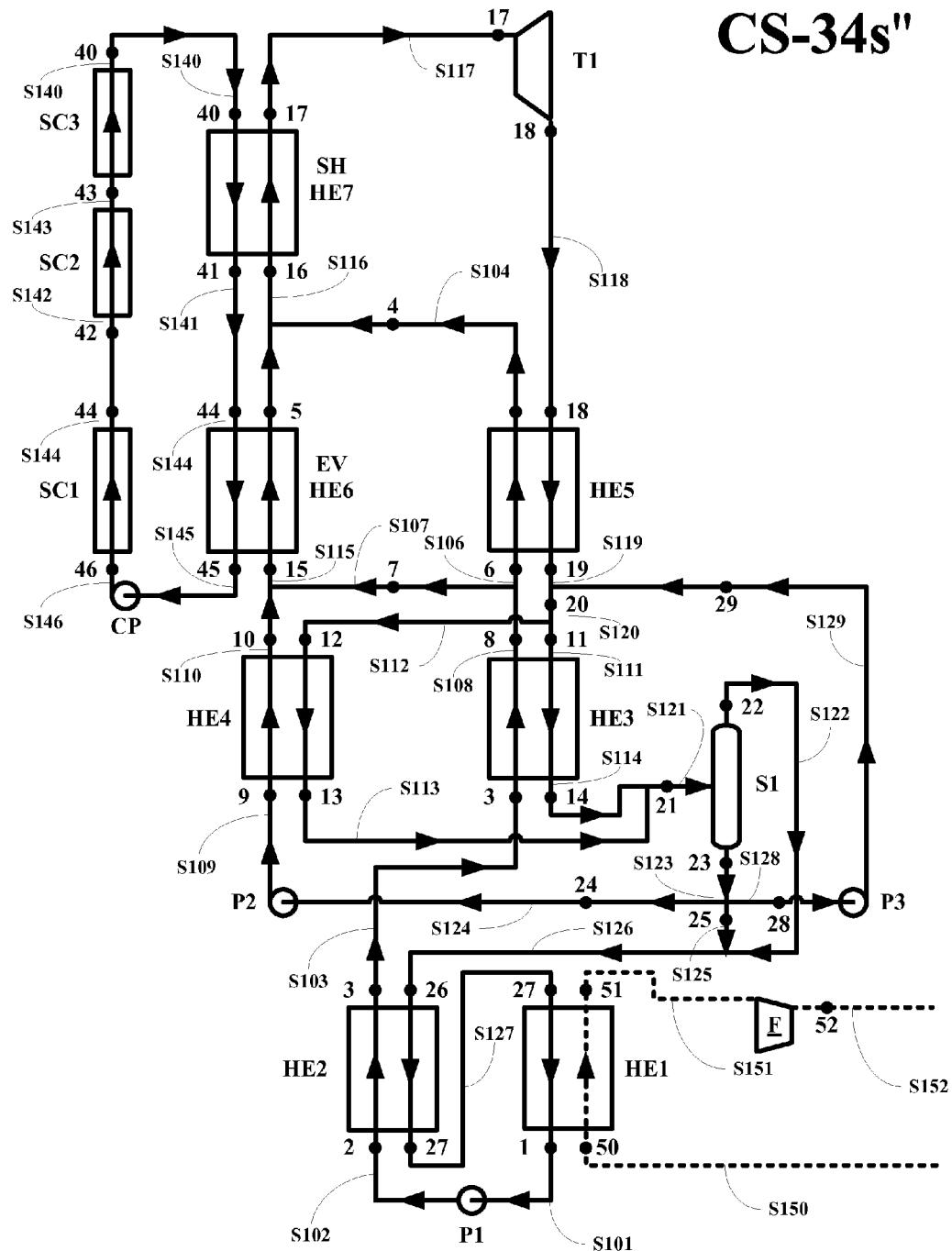
FIG. 1C depicts another embodiment of a system of this invention CS-34s'', where a heat transfer fluid is heated by the solar collector subsystem including a plurality of solar collectors and then used to heat a working fluid of a heat conversion subsystem.
Figure 1D:
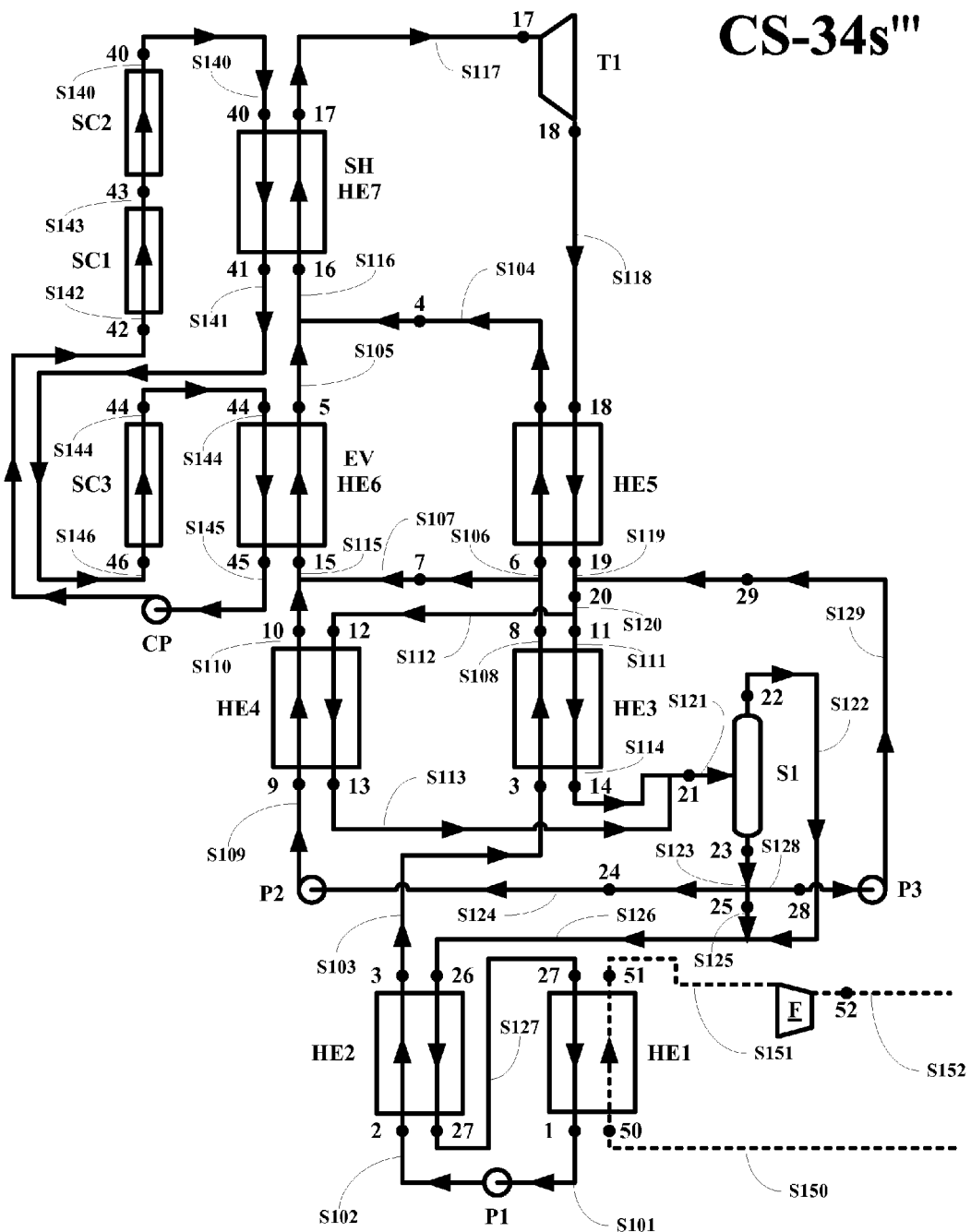
FIG. 1D depicts another embodiment of a system of this invention CS-34s''', where a heat transfer fluid is heated by the solar collector subsystem including a plurality of solar collectors and then used to heat a working fluid of a heat conversion subsystem.
Figure 1E:
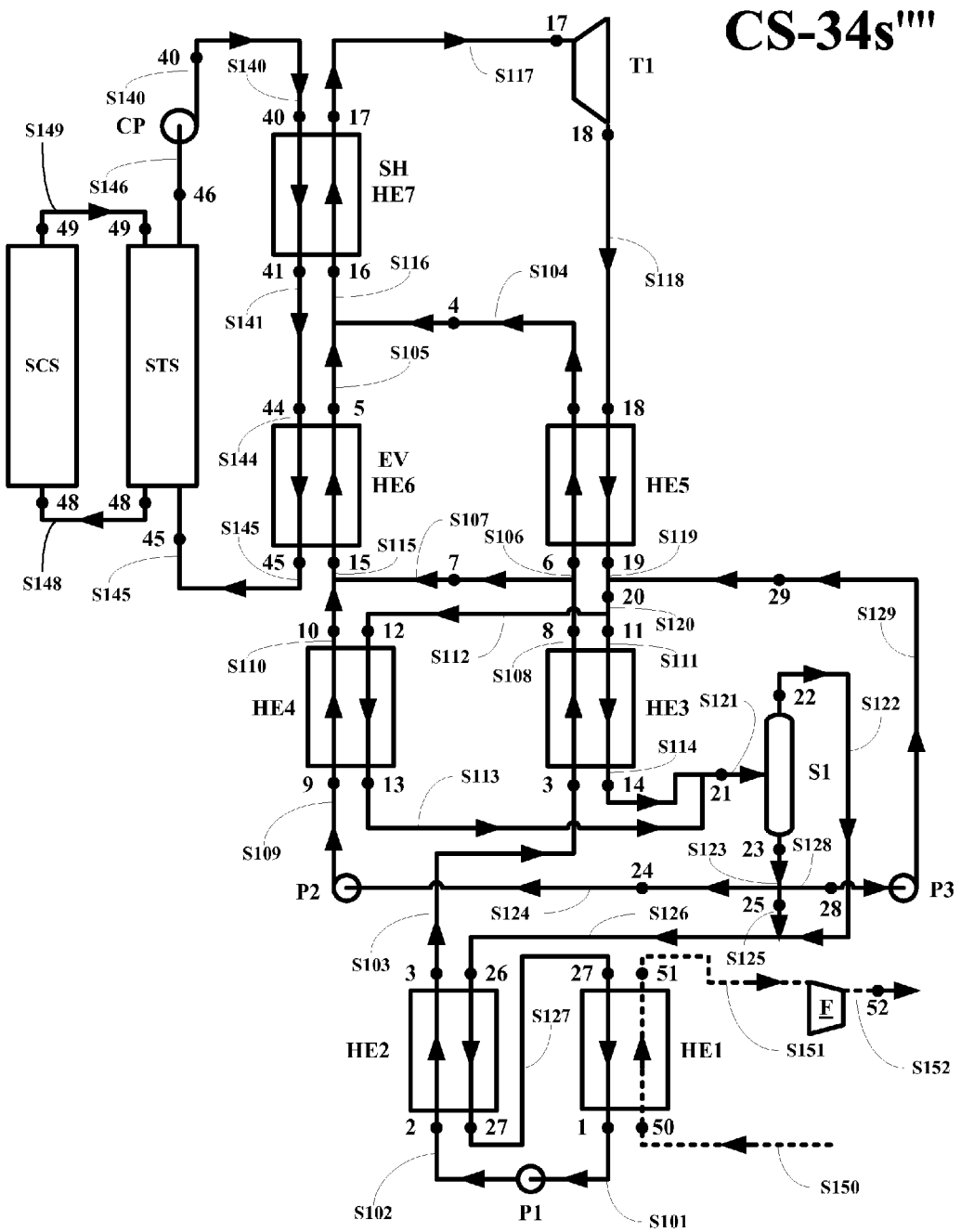
FIG. 1E depicts another embodiment of a system of this invention CS-34s'''', where a heat transfer fluid from a thermal storage tank subsystem heated by a solar collector subsystem is used to heat a working fluid of a heat conversion subsystem.

The inventor has found that power systems can be designed for the efficient use of heat generated by solar-thermal collectors. Embodiments of present system is designed to attain high thermal efficiency at lower absorber temperatures, thereby reducing radiated losses from the absorber and improving the efficiency of the solar collectors. Embodiments of the present system utilizes a multi-component working fluid.

Embodiment of the present invention relate to systems for converting heat collected by a solar collector subsystem into a useable form of energy either by directly heating a working fluid of a heat conversion subsystem or indirectly through a heat transfer fluid. The systems using a heat transfer fluid include two heat exchange units to superheat an intermediate solution stream and a working solution stream. The systems using directly solar heating includes at least one solar collector, instead of the two heat exchange units. The systems all includes a turbine for converting a portion of the heat in the fully vaporized and superheated working solution stream is into a useable form of energy. The systems also include four heat exchange units designed to transfer heat from returning internal streams to upcoming internal stream. The systems also include a condenser for condensing a basic rich solution stream using an external coolant. The system also include a separator for separating a condensing solution stream into a lean solution stream and a rich vapor stream. The systems also include forming a working fluid stream, a basic rich solution stream, a lean solution stream, a rich vapor stream, and an intermediate stream. These streams interact to increase the efficiency of solar collector power generator systems.

Embodiments of the present invention relate to methods for converting solar energy into a useable from of energy. The methods include forming working fluid stream, a basic rich solution stream, a lean solution stream, a rich vapor stream, and an intermediate stream. The method includes fully vaporizing and superheating the working solution stream using directly or indirectly solar energy from a solar collector subsystem and converting a portion of its heat in a turbine to a useable form of energy. The methods also include vaporizing an intermediate solution stream using directly or indirectly solar energy from the solar collector subsystem. The methods also include vaporizing a basic rich solution stream using heat from a spent working solution stream. The methods also include forming a condensing solution stream from a cooled spent working solution stream and a first lean solution substream. The methods also include dividing the condensing solution stream into a two condensing solution substreams. The methods also include transferring heat from a first condensing solution substream to a pre-heated basic working solution stream and transferring heat from the second condensing solution subsystem to a second lean solution substream. The methods also include combining the two partially condensed condensing solution substreams and sending the combined condensing solution stream into a separator. The methods also include separating the combined condensing solution stream into a rich vapor stream and a liquid lean solution stream. The methods also include dividing the lean solution stream into three substreams. The methods also include increasing a pressure of the second lean solution and bringing the stream into a heat exchange relationship with the second condensing solution substream. The third lean solution substream is combined with the rich vapor solution stream to form a basic rich solution stream. The methods also include transferring heat from the basic rich solution stream to a higher pressure basic rich solution stream. The methods also include condensing the cooled basic rich solution to form a fully condensed basic rich solution stream.

All the streams used in the systems of this invention are derived from a single multi-component fluid having at least one lower boiling point component and at least on higher boiling point component. While all of the streams are derived from a single multi-component fluid, the composition of the streams can be the same or different. In embodiments of the present invention, there are at least six different fluid compositions, i.e., six fluid having different ratios of the lower boiling component to the higher boiling component. Streams having a higher concentration of the at least one lower boiling point component compared to the at least one higher boiling point component are referred to as rich solutions, while streams that have a higher concentration of the at least one higher boiling point component compared to the at least one lower boiling point component are referred to as lean solutions. The multi-component fluids used in the systems of this inventions comprise at least one lower boiling point component—the low-boiling component—and at least one higher boiling point component—the high-boiling component. In certain embodiments, the multi-component fluids include an ammonia-water mixture, a mixture of two or more hydrocarbons, a mixture of two or more freon, a mixture of hydrocarbons and freon, or the like. In general, the multi-component fluids can comprise mixtures of any number of compounds with favorable thermodynamic characteristics and solubility. In other embodiments, the multi-component fluids comprise a mixture of water and ammonia.

It should be recognized by an ordinary artisan that at those point in the systems of this invention were a stream is split into two or more sub-streams, valves are used to effect such stream splitting, which are well known in the art or can be manually adjustable or are dynamically adjustable so that the splitting achieves the desired improvement in efficiency. The same is true for combining all stream, which are combined using mixing valves, which are well known in the art or can be manually adjustable or are dynamically adjustable so that the splitting achieves the desired improvement in efficiency.

Suitable heat transfer fluids for use in this invention include, without limitation, meltable salts, synthetic heat transfer fluids such as THERMINOL® (a registered trademark of Solutia Inc. Corporation) and DOWTHERM® (a registered trademark of Dow Chemicals Corporation), natural heat transfer fluids, other fluids capable of acting as a heat transfer fluid, and mixtures or combinations thereof.

Suitable working fluids for use in this invention include, without limitation, a multi-component working fluid including at least one lower boiling component and at least one higher boiling component. In certain embodiments, the working fluids include an ammonia-water mixture, a mixture of two or more hydrocarbons, a mixture of two or more freon, a mixture of hydrocarbons and freon, or the like. In general, the fluid can comprise mixtures of any number of compounds with favorable thermodynamic characteristics and solubility. In certain embodiments, the fluid comprises a mixture of water and ammonia.

DETAILED DESCRIPTION OF DRAWINGS

In Direct Heating Using a Heat Transfer Fluid

Figure 2:
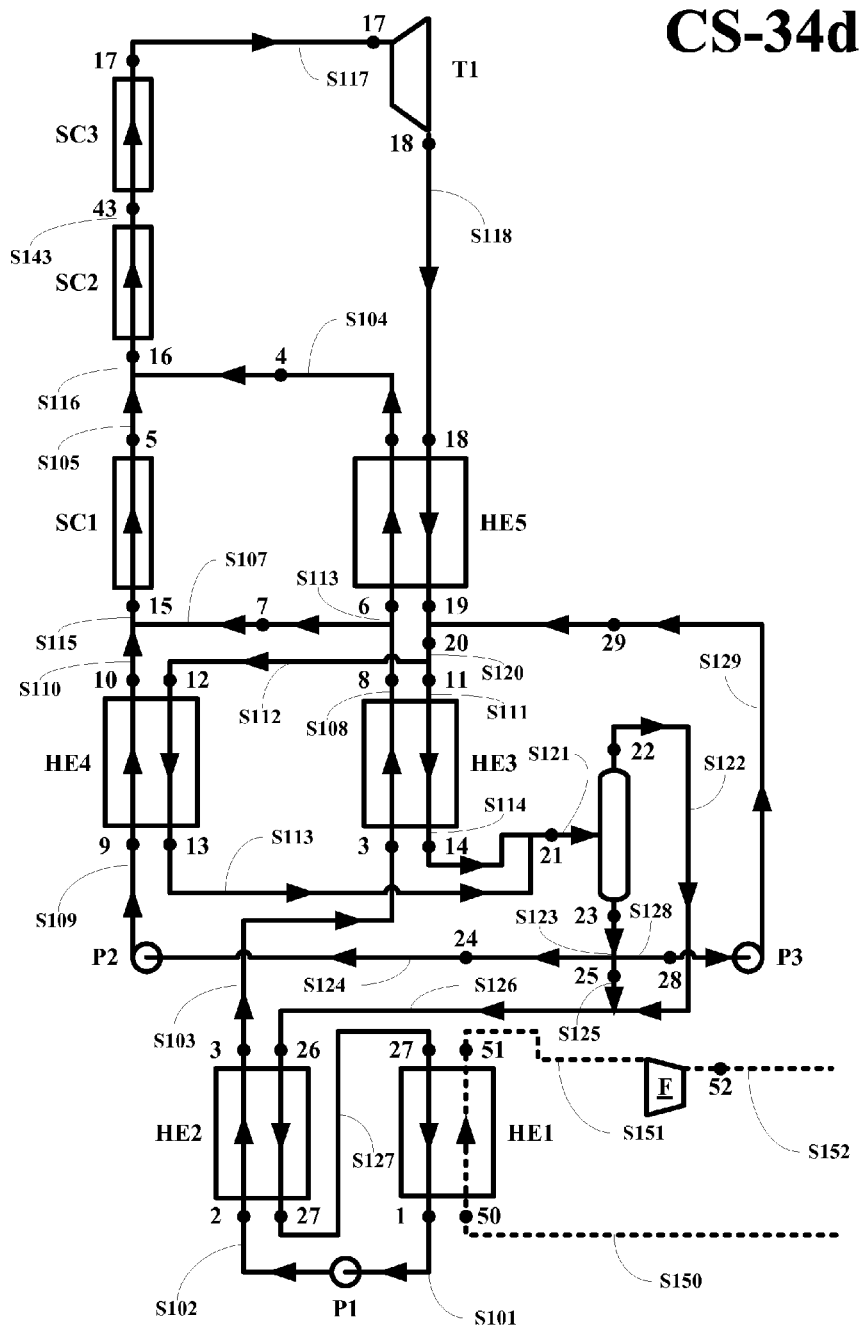
FIG. 2 depicts another embodiment of a system of this invention CS-34d, where the working fluid is directly heated in the solar collector subsystem.

Referring now to FIG. 2A, an embodiment of a system and a method of this invention, generally CS-34s, is shown a fully condensed basic rich solution stream S101 having parameters as at a point 1, which corresponds to a state of saturated liquid. The stream S101 has a composition having a higher concentration of the lower boiling component than the higher boiling point component. The stream S101 is pumped by a feed pump or a first pump P1 to a required elevated pressure to form a higher pressure, fully condensed basic rich solution stream S102 having parameters as at a point 2, which corresponds to a state of subcooled liquid.

Thereafter, the higher pressure, fully condensed basic rich solution stream S102 passes through a pre-heater or second heat exchange unit HE2, where it is heated in counterflow by a returning basic rich solution stream S126 having parameters as at a point 26 in a second heat exchange process 26-27 or 2-3 (as describe below) to form a pre-heated higher pressure basic rich solution stream S103 having parameters as at a point 3, which corresponds to a state of a saturated liquid.

Thereafter, the pre-heated higher pressure basic rich solution stream S103 passes through a recuperative boiling condenser or third heat exchange unit HE3, where it is almost fully vaporized in counterflow by a first condensing solution substream S111 having parameters as at a point 11 in a third heat exchange process 11-14 or 3-8 (as described below) to form a vaporized higher pressure basic rich solution stream S108 having parameters as at a point 8 and a cooled first condensing solution substream S114 having parameters as at a point 14.

Thereafter, the vaporized higher pressure basic rich solution stream S108 is divided into a first vaporized higher pressure basic rich solution substream S106 having parameters as at a point 6 and a second vaporized higher pressure basic rich solution substream S107 having parameters as at a point 7.

The first vaporized higher pressure basic rich solution substream S106 is then sent through a de-superheater or fifth heat exchange unit HE5, where it is fully vaporized and superheated in counterflow by a spent working solution stream S118 having parameters as at a point 18 in a fifth heat exchange process 18-19 or 6-4 (which has a lower concentration of the at least one lower boiling component than the basic rich solution, as described below) to form a fully and superheated higher pressure basic rich solution stream S104 having parameters as at a point 4, which corresponds to a state of superheated vapor and a cooled spent working solution stream S119 having parameters as at a point 19.

The cooled spent working solution stream S119 having the parameters as at the point 19 corresponds to a state of slightly superheated vapor. The cooled spent working solution stream S119 is now mixed with a higher pressure third lean solution substream S129 having parameters as at a point 29, which corresponds to a state subcooled liquid to form a condensing solution stream S120 having parameters as at a point 20, which corresponds to a state of saturated vapor.

The condensing solution stream S120 is now divided into the first condensing solution substream S111 having the parameters as at the point 11 and a second condensing solution substream S112 having parameters as at a point 12. The first condensing solution substream S111 now passes through the third heat exchange unit HE3, where it is partially condensed providing heat for the third heat exchange process 2-8 or 11-14 (as described above) to form the cooled first condensing solution substream S114 having obtains the parameters as at the point 14, which corresponds to a state of vapor-liquid mixture.

At the same time, the second condensing solution substream S112 passes through a fourth heat exchange unit HE4, where it is likewise partially condensed in counterflow with a higher pressure first lean solution substream S109 having parameters as at a point 9 in a fourth heat exchange process 9-10 or 12-13 to form a cooled second condensing solution substream S113 having parameters as at a point 13 (as described below), which corresponds to a state of vapor-liquid mixture and a heated higher pressure first lean solution substream S110 having parameters as at a point 10.

The cooled first and second condensing solution substreams S113 and S114 are now combined to form a combined cooled condensing solution stream S121 having parameters as at a point 21, which is now sent into a gravity separator S1. In the separator S1, the combined cooled condensing solution stream S121 is separated into a saturated vapor S1 rich solution stream S122 having parameters as at a point 22 and a saturated liquid lean solution stream S123 having parameters as at a point 23. The saturated liquid lean solution stream S123 is then divided into a first lean solution substream S124 having parameters as at a point 24, a second lean solution substream S125 having parameters as at a point 25, and a third lean solution substream S128 having parameters as at a point 28.

The third lean solution substream S128 is sent into a circulating pump or third pump P3, where its pressure is increased to a pressure equal or substantially equal to a pressure of the cooled spent working solution stream S119 having the parameters as at the point 19 (as described above) to form the higher pressure third lean solution substream S129 having parameters as at a point 29. The higher pressure third lean solution substream S129 is then mixed with the cooled spent working solution stream S119 to form the condensing solution stream S120 having the parameters as at the point 20 (as described above).

Meanwhile, the first lean solution substream S124 is pumped by a circulating pump or second pump P2, to a elevated pressure to form the higher pressure first lean solution substream S109 having the parameters as at the point 9, which corresponds to a state of subcooled liquid.

Thereafter, the higher pressure first lean solution substream S109 passes through the fourth heat exchange unit HE4, where it is heated in counterflow by the second condensing solution substream S112 in the fourth heat exchange process 12-13 or 9-10 (as described above) to form a heated higher pressure first lean solution substream S110 having the parameters as at the point 10, which corresponds to a state of subcooled liquid.

When the heated higher pressure basic rich solution stream S108 having the parameters as at the point 8 was divided into the heated higher pressure first and second basic rich solution substreams S106 and S107 having the parameters as at the points 6 and 7, respectively, a flow rate of the heated higher pressure first basic rich solution substream S106 is chosen in such a way that the heated higher pressure first basic rich solution substream S106 can absorb the heat released by the spent working solution stream S118 in the fifth heat exchange process 18-19 or 6-4 in the fifth heat exchange unit HE5 (as described above).

Excess heated higher pressure basis rich solution from the stream S108 therefore forms the heated higher pressure second basis rich solution substream S107 (as described above). The heated higher pressure second basis rich solution substream S107 is then mixed with the heated higher pressure first lean solution substream S110 (as describe above) and is fully absorbed by the heated higher pressure first lean solution substream S110 to form an intermediate solution stream S115 having parameters as a point 15, which is in a state of a subcooled or saturated liquid.

Thereafter, the intermediate solution stream S115 passes through an evaporator or sixth heat exchange unit EV or HE6, where it is heated and fully vaporized in counterflow with a hot first heat transfer fluid (HTF) stream S144 having parameters as at a point 44 in a sixth heat exchange unit 44-45 or 15-5 (as described below) to form a heated intermediate solution stream S105 having parameters as at a point 5, which corresponds to a state of saturated vapor, and a cold first HTF stream S145 having parameters as at a point 45.

The heated intermediate solution stream S105 and the fully and superheated higher pressure basic rich solution substream S104 are now mixed to form a working solution stream S116 having parameters as at a point 16, which corresponds to a state of superheated vapor.

The stream S116 is then sent into a superheater or seventh heat exchange unit SH or HE7, where it is further superheated in counterflow with a hot second HTF stream S140 having parameters as at a point 40 in a seventh heat exchange process 40-41 or 16-17 (as described below) to form a fully vaporized and superheated working solution stream S117 having parameters as at a point 17, corresponding to a state of superheated vapor, and a cold second HTF stream S141 having parameters as at a point 41.

The stream S117 is now sent into a turbine T1, where it is expanded and a portion of its heat is converted in to mechanical then electrical energy or another useable form of energy to form the spent working solution stream S118 having the parameters as at the point 18 (as described above).

Meanwhile, the second lean solution substream S125 having the parameters as at the point 25 is combined with the saturated vapor S1 rich stream S122 having the parameters as at the point 22 to form the basic rich solution stream S126 having the parameters as at the point 26.

The basic rich solution stream S126 now passes though the second heat exchange unit HE2, where it is further condensed providing heat for the second heat exchange process 2-3 or 26-27 (as described above) to from a partially condensed basic rich solution stream S127 having the parameters as at a point 27, which corresponds to a state of a vapor-liquid mixture.

Thereafter, the partially condensed basic rich solution stream S127 is sent though a final condenser or first heat exchange unit HE1, where it is further cooled by a coolant stream S150 in a first heat exchange process 50-51 or 27-1 to form the fully condensed basic rich solution stream S101 having parameters as at a point 1. The coolant can be air or water or any other coolant.

The cycle is closed.

Meanwhile, the coolant stream S150 having the initial parameters as at the point 50 as it passes through the first heat exchange unit HE1 is heated by the stream S127 (as described above) to form a spent coolant stream S151 having parameters as at a point 51. A pressure of the stream S150 having the parameters as at the point 50 is usually equal to atmospheric pressure; a pressure of the stream S151 having the parameters as at the point 51 is slightly below atmospheric pressure. The stream S151 is then sent through a fan F, where its pressure is increased to atmospheric pressure to form an exhaust coolant stream S152 having parameters as at a point 52. The exhaust coolant stream S152 is discharged into the atmosphere. This assumes the use of air as a coolant. If water is used as the coolant, the fan F is replaced by a coolant exhaust pump.

The cold first HTF stream S144, which is used to heat the intermediate solution stream S115 in the sixth heat exchange unit HE6, is heated in a first solar collector SC1. The hot second HTF stream S140, which is used to heat the working solution stream S116 in the seventh heat exchange unit HE7, is heated in a second and third solar collectors SC2 and SC3 arranged in a series configuration.

In certain embodiments of the present system, a flow rate of the hot first HTF stream S144 passing through the sixth heat exchange unit HE6 (the evaporator) is substantially higher than a flow rate of the hot second HTF stream S140 passing through the seventh heat exchange unit HE7 (the superheater). As a result the adjusted flow rates of the hot first and second HTF streams S140 and S144, respectively, a mean temperature of the heat acquisition in the absorbers of solar collectors SC1, SC2 and SC3 is substantially reduced, which in turn increases the efficiency of the solar collectors, reducing the required surface area of the collectors. As a result, the heating of the first and second HTF streams S144 and S140 in this embodiment is preformed in series.

The cold first HTF stream S145 is pumped by a first HTF circulating pump CP1, where its pressure is increased to form a higher pressure cold first HTF stream S146 having parameters as at a point 46. The higher pressure cold first HTF stream S146 then passes through the first solar collector SC1, where it is heated to form the hot higher pressure first HTF stream S144 having the parameters as at the point 44. Thereafter, the hot higher pressure first HTF stream S144 passes through the sixth heat exchange unit HE6, providing heat for process 15-5 or 44-45 (as described above).

The cold second HTF stream S141 is pumped by a second HTF circulating pump CP2, where its pressure is increased to form a higher pressure cold second HTF stream S142 having parameters as at a point 42. The higher pressure cold second HTF stream S142 then passes through a second solar collector SC2, where it is heated to form a heated higher pressure second HTF stream S143 having parameters as at a point 43. The eated higher pressure second HTF stream S143 then passes through a third solar collector SC3, where it is further heated to form the hot higher pressure second HTF stream S140 having the parameters as at the point 40. Thereafter, the hot higher pressure second stream S140 passes through the seventh heat exchange unit HE7 providing heat for process 16-17 or 40-41 (as described above).

The first solar collector SC1, which provides heat for the sixth heat exchange process 15-5 or 44-45 in the sixth heat exchange unit HE6 (the evaporator) can be replaced by two or more consecutive solar collectors or series arranged solar collectors. Likewise, the second and third SC2 and SC3 can be replaced by a larger quantity of consecutive solar collectors or series arranged solar collectors, or by a larger single solar collector.

Referring now to FIG. 2B, another embodiment of a system and a method of this invention, generally CS-34s', is shown, where the system is identical to the system of CS-34s, except that the system CS-34s' uses only a single heat transfer fluid and a single solar collector subsystem SC. Thus, the cold heat transfer fluid (HTF) stream S145 having the parameters as at the point 45 is pumped to a higher pressure in a circulating HTF pump CP to a higher pressure cold HTF stream S146 having the parameters as at the point 46. The higher pressure cold HTF stream S146 passes through the solar collector subsystem SC to form a hot heated higher pressure HTF stream S140 having the parameters as at the point 40. The hot higher pressure HTF stream S140 is then sent into the seventh heat exchange unit HE7 to superheat the stream S116, to form a cooled HTF stream S141 having the parameters as at the point 41, which is now the same as the stream S144 having the parameters as at the point 44. The cooled HTF stream S141 or S144 is sent through the sixth heat exchange unit HE6 to superheat the stream S115. In this way, a single heat transfer fluid is used instead of two heat transfer fluids. This arrangement simplifies the heat collection apparatus, but increases the mean temperature of heat acquisition in the solar collectors, thereby reducing the efficiency of the solar collectors and requiring more solar collector surface area in total. This arrangement simplifies the heat collection apparatus, but increases the mean temperature of heat acquisition in the solar collectors, thereby reducing the efficiency of the solar collectors and requiring more solar collector surface area in total.

Referring now to FIG. 2C, another embodiment of a system and a method of this invention, generally CS-34s''', is shown, where the system is identical to the system of CS-34s, except that the system CS-34s''' uses only a single heat transfer fluid. Thus, the cold heat transfer fluid (HTF) stream S145 having the parameters as at the point 45 is pumped to a higher pressures in a circulating HTF pump CP to a higher pressure cold HTF stream S146 having the parameters as at the point 46. The higher pressure cold HTF stream S146 passes through a first solar collector SC1 to form a heated higher pressure HTF stream S144 having the parameters as at the point 44, which is now the same of the stream S142 having the parameters as at the point 42. The heated higher pressure HTF stream S144 or S142 is further heated in a second solar collector SC2 to form a further heated higher pressure HTF stream S143 having the parameter as at the point 43, which is then sent into a third solar collector SC3 to form a hot higher pressure HTF stream S140 having the parameters as at the point 40. The hot higher pressure HTF stream S140 is then sent into the seventh heat exchange unit HE7 to superheat the stream S116, to form the cooled HTF stream S141 having the parameters as at the point 41, which is now the same as the stream S144 having the parameters as at the point 44. The cooled HTF stream S141 or S144 is sent through the sixth heat exchange unit HE6 to superheat the stream S115. In this way, a single heat transfer fluid is used instead of two heat transfer fluids. This arrangement simplifies the heat collection apparatus, but increases the mean temperature of heat acquisition in the solar collectors, thereby reducing the efficiency of the solar collectors and requiring more solar collector surface area in total.

Referring now to FIG. 2D, another embodiment of a system and a method of this invention, generally CS-34s''', is shown, where the system is identical to the system of CS-34s, except that the system CS-34s''' uses only a single heat transfer fluid. Thus, the cold heat transfer fluid (HTF) stream S145 having the parameters as at the point 45 is pumped to a higher pressure in a circulating HTF pump CP to a higher pressure cold HTF stream S142 having the parameters as at the point 42. The higher pressure cold HTF stream S142 passes through a first solar collector SC1 to form a heated higher pressure HTF stream S143 having the parameters as at the point 43. The heated higher pressure HTF stream S143 is further heated in a second solar collector SC2 to form a hot higher pressure HTF stream S140 having the parameter as at the point 40. The hot higher pressure HTF stream S140 is then sent into the seventh heat exchange unit HE7 to superheat the stream S116, to form the cooled HTF stream S141 having the parameters as at the point 41, which is now the same as the stream S146 having the parameters as at the point 46. The cooled HTF stream S141 or S146 is then sent through a third solar collectors SC3 to form a hot HTF stream S144 having the parameters as at the point 44. The hot HTF stream S144 is then sent through the sixth heat exchange unit HE6 to superheat the stream S115. In this way, a single heat transfer fluid is used instead of two heat transfer fluids. This arrangement simplifies the heat collection apparatus, but increases the mean temperature of heat acquisition in the solar collectors, thereby reducing the efficiency of the solar collectors and requiring more solar collector surface area in total.

One experienced in the art can choose a optimal combination of solar collectors and a rate of circulation of HTF and working fluid based on economic and operational considerations.

The working fluids in the streams S115 and S116 having the parameters as at the points 15 and 16, respectively, i.e., at the points of entrance into the corresponding heat exchange apparatuses HE6 and HE7, is at each point in a single state; the fluid in the stream S115 is fully liquid and the fluid in the stream S116 is fully vapor. In the direct embodiments of this invention, the streams S115 and S116 are sent directly into the absorbers of solar collectors. In such a case, the heat exchange apparatuses HE6 and HE7 do not exist and the working fluid goes directly from the solar collectors to the turbine.

Referring now to FIG. 2E, an embodiment of a system and a method of this invention, generally CS-34s'''', is shown, where the hot heat transfer fluid is transferred from an energy storage system for the operation of the power system at night such as the energy storage subsystem described in co-pending U.S. patent application Ser. No. 12/688,224, filed 15 Jan. 2010, and the cold heat transfer fluid is transferred back to the energy storage system. The heat transfer fluid is sent through a solar collector subsystem to for hot heat transfer fluid which is sent back to the energy storage subsystem for later use in the power system of this invention. This embodiments is identical to the system of CS-34s, except that the system uses only hot heat transfer fluid stored in storage tank subsystem STS and a solar collector subsystem SCS. A hot HTF stream S146 from the STS is pumped to a higher pressure in a circulating pump CP to from a higher pressure hot HTF stream S140 having the parameters as at the point 40. The hot higher pressure HTF stream S140 is then sent into the seventh heat exchange unit HE7 to superheat the stream S116, to form the cooled HTF stream S141 having the parameters as at the point 41, which is now the same as the stream S144 having the parameters as at the point 44. The cooled HTF stream S141 or S144 is sent through the sixth heat exchange unit HE6 to superheat the stream S115 to form the cold HTF stream S145 having the parameters as at the point 45. The cold HTF stream S145 is returned to the STS. The thermodynamic cycle is operated during the night, while during the day, a cold HTF stream S148 having a parameters as at a point 48 from the STS is sent through the SCS during the day to form a hot HTF stream S149 having parameters as at a point 49, which is stored in the STS for use in the thermodynamic cycle at night. The system described above uses HTF to transfer heat from the solar collectors to the working fluid. It is also possible to use the working fluid directly in the absorber of the solar collectors.

Direct Heating of Working Fluid

Referring now to FIG. 3, a variant of the system of this invention is shown, generally CS-34d, where the working fluid streams are heated directly by the solar collectors instead of using a HTF. The system CS-34d is shown a basic rich solution stream S101 having parameters as at a point 1, which corresponds to a state of saturated liquid. The stream S101 has a composition having a higher concentration of the lower boiling component than the higher boiling point component. The stream S101 is pumped by a feed pump or a first pump P1 to a required elevated pressure to form a higher pressure basic rich solution stream S102 having parameters as at a point 2, which corresponds to a state of subcooled liquid.

Thereafter, the stream S102 passes through a pre-heater or second heat exchange unit HE2, where it is heated in counterflow by a returning basic rich solution stream S126 having parameters as at a point 26 in a second heat exchange process 26-27 or 2-3 (as describe below) to form a pre-heated basic rich solution stream S103 having parameters as at a point 3, which corresponds to a state of a saturated liquid.

Thereafter, the stream S103 passes through a recuperative boiling condenser or third heat exchange unit HE3, where the stream S103 is almost fully vaporized in counterflow by a second condensing solution substream S111 having parameters as at a point 11 in a third heat exchange process 11-14 or 3-8 (as described below) to form a vaporized basic rich solution stream S108 having parameters as at a point 8 and a cooled second condensing solution substream S114 having parameters as at a point 14.

Thereafter, the stream S108 is divided into a first vaporized basic rich solution substream S106 having parameters as at a point 6 and a second vaporized basic rich solution substream S107 having parameters as at a point 7.

The substream S106 is then sent through a de-superheater or fifth heat exchange unit HE5, where it is fully vaporized and superheated in counterflow by a spent working solution stream S118 having parameters as at a point 18 in a fifth heat exchange process 18-19 or 6-4 (which has a lower concentration of the at least one lower boiling component than the basic rich solution, as described below) to form a superheated substream S104 having parameters as at a point 4, which corresponds to a state of superheated vapor and a cooled spent working solution stream S119 having parameters as at a point 19.

The stream S119 having the parameters as at the point 19 corresponds to a state of slightly superheated vapor. The stream S119 is now mixed with a liquid lean solution stream S129 having parameters as at a point 29, which corresponds to a state subcooled liquid to form a condensing solution stream S120 having parameters as at a point 20, which corresponds to a state of saturated vapor.

The stream S120 is now divided into the first condensing solution substream S111 having the parameters as at the point 11 and a second condensing solution substream S112 having parameters as at a point 12. The stream S111 now passes through the third heat exchange unit HE3, where it is partially condensed providing heat for the third heat exchange process 3-8 or 11-14 (as described above) to form the cooled first condensing solution stream S114 having obtains parameters as at a point 14, which corresponds to a state of vapor-liquid mixture.

At the same time, the substream S112 passes through a fourth heat exchange unit HE4, where it is likewise partially condensed in counterflow with an upcoming lean solution stream S109 having parameters as at a point 9 in a fourth heat exchange process 9-10 or 12-13 to form a cooled second condensing solution substream S113 having parameters as at a point 13 (as described below), which corresponds to a state of vapor-liquid mixture and a heated upcoming lean solution stream S110 having parameters as at a point 10.

The cooled substreams S113 and S114 are now combined to form a combined cooled condensing solution stream S121 having parameters as at a point 21, which is now sent into a gravity separator S1. In the separator S1, the stream S121 is separated into a saturated vapor stream S122 having parameters as at a point 22 and a saturated liquid lean solution stream S123 having parameters as at a point 23. The stream S123 is then divided into a first lean solution substream S124 having parameters as at a point 24, a second lean solution substream S125 having parameters as at a point 25, and a third lean solution substream S128 having parameters as at a point 28.

The third lean solution substream S128 is sent into a circulating pump or third pump P3, where its pressure is increased to a pressure equal to or substantially equal to a pressure of the cooled spent stream S119 having the parameters as at the point 19 (as described above) to form a higher pressure lean solution stream S129 having parameters as at a point 29. The stream S129 is then mixed with the cooled spent stream S119 to form the condensing solution stream S120 having the parameters as at the point 20 (as described above).

Meanwhile, the first lean solution substream S124 is pumped by a circulating pump or second pump P2, to a elevated pressure to form a higher pressure lean solution substream S109 having the parameters as at the point 9, which corresponds to a state of subcooled liquid.

Thereafter, the higher pressure lean solution substream S109 passes through the fourth heat exchange unit HE4, where it is heated in counterflow by the stream S112 in the fourth heat exchange process 12-13 or 9-10 (as described above) to form a heated higher pressure lean solution substream S110 having parameters as at a point 10, which corresponds to a state of subcooled liquid.

When the vaporized basic rich solution stream S108 having the parameters as at the point 8 was divided into the substreams S106 and S107 having the parameters as at the points 6 and 7, respectively, a flow rate of the substream S106 is chosen in such a way that the substream S106 can absorb the heat released by the spent working solution stream S118 in the fifth heat exchange process 18-19 or 6-4 in the fifth heat exchange unit HE5 (as described above).

Excess basis rich solution from the stream S108, therefore is used to form the substream S107 (as described above). The substream S107 is then mixed with the substream S110 (as describe above) and is fully absorbed by the substream S110 to form an intermediate solution stream S115 having parameters as a point 15, which is in a state of a subcooled or saturated liquid.

Thereafter, the intermediate solution stream S115 passes through a first solar collector SC1, where it is heated and fully vaporized to form a heated intermediate solution stream S105 having parameters as at a point 5, which corresponds to a state of saturated vapor.

The heated intermediate solution stream S105 and the substream S104 are now mixed to form a working solution stream S116 having parameters as at a point 16, which corresponds to a state of superheated vapor. The stream S116 is then sent into a second solar collector SC2, where it is further superheated to form a superheated working solution stream S143 having parameters as at a point 43. The stream S143 is then sent into a third solar collector SC3, where it is further heated to form the fully vaporized and superheated working solution stream S117 having parameters as at a point 17, which corresponds to a state of superheated vapor.

The stream S117 is now sent into a turbine T1, where it is expanded and a portion of its heat is converted into power or a useable form of energy to form the spent working solution stream S118 having the parameters as at the point 18 (as described above).

Meanwhile, the second lean solution substream S125 having the parameters as at the point 25 is combined with the saturated vapor stream S122 having the parameters as at the point 22 to form the basic rich solution stream S126 having the parameters as at the point 26.

The stream S126 now passes though the second heat exchange unit HE2, where it is further condensed providing heat for the second heat exchange process 2-3 or 26-27 (as described above) to from the partially condensed basic rich solution stream S127 having the parameters as at the point 27, which corresponds to a state of a vapor-liquid mixture.

Thereafter, the stream S127 is sent though a final condenser or first heat exchange unit HE1, where it is further cooled by a coolant stream S150 in a first heat exchange process 50-51 or 27-1 to form a fully condensed basic rich solution stream S101 having parameters as at a point 1. The coolant can be air or water or any other coolant.

The cycle is closed.

Meanwhile, the coolant stream S150 having the initial parameters as at the point 50 as it passes through the first heat exchange unit HE1 is heated by the stream S127 (as described above) to form a spent coolant stream S151 having parameters as at a point 51. A pressure of the stream S150 having the parameters as at the point 50 is usually equal to atmospheric pressure; a pressure of the stream S151 having the parameters as at the point 51 is slightly below atmospheric pressure. The stream S151 is then sent through a fan F, where its pressure is increased to atmospheric pressure to form an exhaust coolant stream S152 having parameters as at a point 52. The stream S152 is discharged into the atmosphere. This assumes the use of air as a coolant. If water is used as the coolant, the fan F is replaced by a coolant exhaust pump.

The first solar collector SC1 can be replaced by two or more consecutive solar collectors or series arranged solar collectors. Likewise, the second and third SC2 and SC3 can be replaced by a larger quantity of consecutive solar collectors or series arranged solar collectors, or by a larger single solar collector.

Stream Compositions

The systems of this invention utilize a multi-component fluid, from which all of the streams are derived. The system uses five principal composition or solution in the streams and one vapor stream. The five principals solutions include a basic rich solution, a lean solution, a working solution, a condensing solution and an intermediate solution. The one vapor stream is formed in the separator and immediately combined with a lean solution substream. The solutions and corresponding streams and points are set forth in Table 1.

TABLE 1

Solution, Stream and Points

| Name | Streams | Points |
|---|---|---|
| basic rich solution | S126, S127, S101, S102, S103, S108, S106, S107, S104 | 26, 27, 1, 2, 3, 8, 6, & 7 |
| working solution | S116, S117, S118, S119 | 16, 17, 18 & 19 |
| condensing solution | S120, S111, S112, S113, S114, S121 | 20, 11, 12, 13, 14, & 21 |
| lean solution | S123, S124, S125, S128, S129, S109, S110 | 23, 24, 25, 28, 29, 9 & 10 |
| intermediate solution | S115, S105 | 15 & 5 |
| S1 rich vapor solution | S122 | 22 |

The basic rich solution is rich having a higher concentration of the lower boiling component of the multi-component fluid than the higher boiling component, while the lean solution is lean having a higher concentration of the higher boiling component of the multi-component fluid. The vapor solution is also rich having a higher concentration of the lower boiling component of the multi-component fluid. The intermediate solution is leaner than the working solution. The condensing solution is leaner than the working solution. The lean solution is leaner than the condensing solution.

Comparison of the Present Invention with a Rankine Cycle

In the prior art, the power system used for solar-thermal applications is a Rankine cycle system, with multiple-state feed-water heating and two re-heats. Because of the two re-heats, such a Rankine cycle system requires three consecutive turbines; a high pressure turbine, a medium pressure turbine and low pressure turbine. The low pressure turbine used in the Rankine cycle have an outlet pressure which requires a vacuum, i.e., the outlet pressure is substantially below atmospheric pressure. In contrast, the present system uses only a single turbine.

For embodiments of the present using a water-ammonia multi-component fluid, which requires a relatively high pressure for condensation, the single turbine will have a high outlet pressure, pressures over 120 psia. Due to the high pressure of condensation, the pressure in the gravity separator S1 (the separator) is likewise high. The pressure in the separator S1 is generally slightly higher than the pressure of condensation. To restore the composition of the basic rich solution, the composition of vapor exiting the separator S1 as the stream S122 having parameters as at the point 22 must have a concentration of ammonia which is slightly higher than the concentration of ammonia in the basic rich solution. As a result, a temperature at which the separator S1 operates cannot exceed a temperature at which such a rich vapor can be generated. At the same time, a temperature at which the basic rich solution begins to boil in the stream S103 having the parameters as at the point 3 must be lower than a temperature of the stream S121 having the parameters as at the point 21 (the temperature at which the separate S1 operates). This limits the pressure of the stream S103 having the parameters as at the point 3, and likewise limits an inlet pressure of the turbine T1 of the S117 having the parameters as at the point 17. As a result, the turbine T1 in the present system has a moderate inlet pressure and a relatively high outlet pressure. Such a turbine has a higher efficiency and a much lower cost than the three staged turbines used in a Rankine cycle system for solar-thermal applications.

In the present system, condensation of the working fluid occurs in the first heat exchange apparatus HE1 at a substantially elevated pressure, which corresponds to a higher heat transfer coefficient in the first heat transfer apparatus HE1. As a result, the condenser or first heat transfer apparatus HE1 of the present system is much smaller and less costly than in a vacuum condenser needed in the prior art.

The present system has a much higher thermodynamic efficiency (i.e., $2^{nd}$ Law efficiency) than the prior art Rankine cycle system. Thus, the net thermal efficiency of the present system is higher than the net thermal efficiency of the Rankine cycle system used in the prior art, at any given equal maximum temperature of working fluid.

At the same time, the mean temperature of heat acquisition in the absorber of the solar collectors is substantially lower in the present system than in the prior art Rankine cycle system. As noted above, this means that the present system will have a higher efficiency of its solar collectors and thus require a smaller surface area of solar collectors, leading to substantial cost savings.

A comparison of the performance of the present system and the prior art Rankine cycle system is presented in Table 2.

TABLE 2

Comparison of CS-34s and Rankine Cycle

| Heat Source Tmax | | CS-34s | | Rankine Cycle* | | NTE | MTAH |
|---|---|---|---|---|---|---|---|
| ° C. | ° F. | NTE (%) | MTAH (° C.) | NTE (%) | MTAH (° C.) | % Diff | % Diff |
| 580 | 1076 | 37.28 | 340.03 | 35.76 | 477.24 | 4.08 | 28.75 |
| 560 | 1040 | 36.63 | 330.50 | 35.07 | 458.18 | 4.26 | 27.87 |
| 540 | 1004 | 35.96 | 319.99 | 34.38 | 440.02 | 4.39 | 27.28 |
| 520 | 968 | 35.27 | 309.73 | 33.69 | 422.67 | 4.48 | 26.72 |
| 500 | 932 | 34.57 | 301.55 | 33.00 | 406.10 | 4.54 | 25.74 |
| 480 | 896 | 33.85 | 291.59 | 32.31 | 390.25 | 4.55 | 25.28 |
| 460 | 860 | 33.11 | 280.25 | 31.62 | 375.07 | 4.50 | 25.28 |
| 440 | 824 | 32.34 | 270.82 | 30.93 | 360.52 | 4.36 | 24.88 |
| 420 | 788 | 31.56 | 261.42 | 30.24 | 346.56 | 4.18 | 24.57 |
| 400 | 752 | 30.74 | 252.25 | 29.55 | 333.16 | 3.87 | 24.29 |
| 380 | 716 | 29.90 | 243.21 | 28.86 | 320.29 | 3.48 | 24.07 |

NTE means Net Thermal Efficiency
MTAH means Mean Temperature of Absorbed Heat
Cooling air temperature is set at 30° C. (86° F.)
*Data for Rankine Cycle were based on best estimates From the data presented in Table 2, it is evident that the net efficiencies of the present invention at all temperatures is improved relative to the Rankine Cycle and the mean temperature of the cycle is substantially reduced relative to the Rankine cycle. The present system gives rise to efficiency increases of 3.48% and 4.08% over the Tmax range of 380° C. to 580° C. The present invention also gives rise to mean temperature of absorbed heat reductions of 24.07% and 28.75% over the Tmax range of 380° C. to 580° C.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A system for converted solar energy into mechanical energy, electrical energy or another useable form of energy comprising:
    a solar collector subsystem for directly or indirectly and separately vaporizing and superheating an intermediate solution stream comprising a heated basic rich solution substream and a lean solution substream and a working solution stream comprising the vaporized ands superheated intermediate stream and a vaporized basic solution stream, and
    a heat conversion subsystem including:
        a turbine for converting a portion of heat in a fully vaporized and superheated working solution steam to a useable form of energy,
        four heat exchange units for transferring heat from returning streams to upcoming streams, where the returning streams include spent working solution streams, a condensing solution streams and a lean solution substream and the upcoming streams include basic rich solution streams, a lean solution substream, the intermediate stream and the working solution stream,
        a condensing heat exchange unit, where a basic rich solution stream comprising a lean solution substream and a rich vapor stream is fully condensed using an external coolant to form a fully condensed basic rich solution stream,
        a separator, where a partially condensed condensing solution stream is separated into a lean solution stream and a rich vapor stream and where the lean solution stream is divided into three substreams,
        three pumps for increasing a pressure of the fully condensed basic rich solution stream and two of the lean solution substreams, and
        at least five stream mixing valves for combining two or more streams, and
        at least two splitting valves for dividing a stream into two or more substream,
    where all of the solutions are derived form a multi-component fluid including at least one lower boiling component and at least one higher boiling component.

2. The system of claim 1, wherein the solar collector subsystem includes:
    a single solar collector unit, first SC heat exchange unit and second SC heat exchange unit, where the solar collector unit heats a heat transfer fluid and where the hot heat transfer fluid vaporizes and superheats the intermediate solution stream in the first SC heat exchange unit and vaporizes and superheats the working solution stream in the second SC heat exchange unit.

3. The system of claim 1, wherein the solar collector subsystem includes:
    a plurality of series arranged collector units, first SC heat exchange unit and second SC heat exchange unit, where at least one solar collector unit heats a first heat transfer fluid and the first SC heat exchange unit vaporize and superheat the intermediate solution stream and where at least two solar collector units heat a second heat transfer fluid and the second SC heat exchange unit vaporize and superheat the working solution stream.

4. The system of claim 1, wherein the solar collector subsystem includes:
    a solar collector system, a thermal storage system, first SC heat exchange unit and second SC heat exchange unit, where the solar collector system heats a heat transfer fluid from the thermal storage system during the day and stores it in the thermal storage system and where hot heat transfer fluid from the thermal storage system during the night transfers heat to vaporize and superheat the intermediate solution stream in the first SC heat exchange unit and where hot heat transfer fluid from the thermal storage system during the night transfers heat to vaporize and superheat the working solution stream in the second SC heat exchange unit.

5. The system of claim 1, wherein the solar collector subsystem includes:
a plurality of solar collector units, where at least one solar collector units directly vaporizes and superheats the intermediate solution stream and at least two solar collector units directly vaporize and superheat the working solution stream.

6. The system of claim 1, wherein the multi-component fluid comprises:
an ammonia-water mixture, a mixture of two or more hydrocarbons, a mixture of two or more freon, or a mixture of hydrocarbons and freon.

7. The system of claim 1, wherein the multi-component fluid comprises:
mixtures of any number of compounds with favorable thermodynamic characteristics and solubility.

8. The system of claim 1, wherein the multi-component fluid comprises:
a mixture of water and ammonia.

9. A method comprising:
fully condensing a cooled basic rich solution stream in a first heat exchange unit HE1 using an external coolant stream to form a fully condensed basic rich solution stream and a spent external coolant stream,
increasing a pressure of the fully condensed basic rich solution stream in a first pump P1 to form a higher pressure fully condensed basic rich solution stream,
heating the higher pressure fully condensed basic rich solution stream with heat from a basic rich solution stream in a second heat exchange unit HE2 to form a preheated higher pressure basic rich solution stream and the cooled basic rich solution stream,
heating the preheated higher pressure basic rich solution stream with heat from a first condensing solution substream in a third heat exchange unit HE3 to form a heated higher pressure basic rich solution stream and a partially condensed first condensing solution substream,
dividing the heated higher pressure basic rich solution stream into a first heated higher pressure basic rich solution substream and a second higher pressure basic rich solution substream,
vaporizing the first higher pressure basic rich solution substream with heat from a spent working solution stream in a fifth heat exchange unit HE5 to form a vaporized first higher pressure basic rich solution substream and a cooled spent working solution stream,
combining the vaporized first higher pressure basic rich solution substream with a vaporized intermediate solution stream to form a working solution stream,
fully vaporizing and superheating the working solution stream in a solar collector subsystem to form the fully vaporized and superheated working solution stream,
converting a portion of heat in the vaporized and superheated working solution stream in a turbine T1 to a useable form of energy to form the spent working solution stream,
combining the second heated basic rich solution substream with a heated higher pressure second lean solution substream to form an intermediate solution stream,
vaporizing the intermediate solution stream in the solar collector subsystem to form the vaporized intermediate solution stream,
heating a higher pressures second lean solution substream with heat from the second condensing solution substream in a fourth heat exchange unit HE4 to form the heated higher pressure second lean solution substream and a partially condensed condensing solution substream,
combining the first and second partially condensed condensing solution substreams to form a partially condensed combined condensing solution stream,
separating the partially condensed combined condensing solution stream in a separator S1 to form a rich vapor solution stream and a liquid lean solution stream,
dividing the liquid lean solution stream into a first lean solution substream, the second lean solution substream and a third lean solution substream,
combining the rich vapor solution stream and the third lean solution substream to form the basic rich solution stream,
increasing a pressure of the second lean solution substream to form the higher pressure second lean solution substream,
increasing a pressure of the first lean solution substream to form a higher pressure first lean solution substream, and
combining the cooled spent working solution stream with the higher pressures first lean solution substream to form the condensing solution stream.

10. The method of claim 9, wherein:
the intermediate solution stream is vaporized and the working solution stream is vaporized and superheated by a single heat transfer fluid heated by a single collar collector unit.

11. The method of claim 9, wherein the solar collector subsystem includes:
a single solar collector unit, first SC heat exchange unit and second SC heat exchange unit, where the solar collector unit heats a heat transfer fluid and where the hot heat transfer fluid vaporizes and superheats the intermediate solution stream in the first SC heat exchange unit and vaporizes and superheats the working solution stream in the second SC heat exchange unit.

12. The method of claim 9, wherein the solar collector subsystem includes:
a plurality of series arranged collector units, first SC heat exchange unit and second SC heat exchange unit, where at least one solar collector unit heats a first heat transfer fluid and the first SC heat exchange unit vaporize and superheat the intermediate solution stream and where at least two solar collector units heat a second heat transfer fluid and the second SC heat exchange unit vaporize and superheat the working solution stream.

13. The method of claim 9, wherein the solar collector subsystem includes:
a solar collector system, a thermal storage system, first SC heat exchange unit and second SC heat exchange unit, where the solar collector system heats a heat transfer fluid from the thermal storage system during the day and stores it in the thermal storage system and where hot heat transfer fluid from the thermal storage system during the night transfers heat to vaporize and superheat the intermediate solution stream in the first SC heat exchange unit and where hot heat transfer fluid from the thermal storage system during the night transfers heat to vaporize and superheat the working solution stream in the second SC heat exchange unit.

14. The method of claim 9, wherein the solar collector subsystem includes:
a plurality of solar collector units, where at least one solar collector units directly vaporizes and superheats the intermediate solution stream and at least two solar collector units directly vaporize and superheat the working solution stream.

15. The method of claim 9, wherein the multi-component fluid comprises:

an ammonia-water mixture, a mixture of two or more hydrocarbons, a mixture of two or more freon, or a mixture of hydrocarbons and freon.

16. The method of claim 9, wherein the multi-component fluid comprises:

mixtures of any number of compounds with favorable thermodynamic characteristics and solubility.

17. The method of claim 9, wherein the multi-component fluid comprises:

a mixture of water and ammonia.

* * * * *